United States Patent
Sigal et al.

(10) Patent No.: US 9,322,653 B2
(45) Date of Patent: Apr. 26, 2016

(54) VIDEO-BASED MOTION CAPTURE AND ADAPTATION

(71) Applicant: Disney Enterprises, Inc., Burbank, CA (US)

(72) Inventors: Leonid Sigal, Burbank, CA (US); Marek Vondrak, Burbank, CA (US); Jessica K. Hodgins, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 119 days.

(21) Appl. No.: 13/742,780

(22) Filed: Jan. 16, 2013

(65) Prior Publication Data

US 2014/0198948 A1    Jul. 17, 2014

(51) Int. Cl.
| | |
|---|---|
| G06K 9/32 | (2006.01) |
| G06T 7/20 | (2006.01) |
| G01C 11/04 | (2006.01) |
| G06K 9/00 | (2006.01) |

(52) U.S. Cl.
CPC .......... *G01C 11/04* (2013.01); *G06K 9/00342* (2013.01)

(58) Field of Classification Search
None
See application file for complete search history.

(56) References Cited

U.S. PATENT DOCUMENTS

| | | | | |
|---|---|---|---|---|
| 7,526,461 | B2* | 4/2009 | Srinivasa et al. | 706/20 |
| 2004/0260177 | A1* | 12/2004 | Simopoulos | 600/437 |
| 2010/0277483 | A1* | 11/2010 | Lee et al. | 345/474 |
| 2010/0329560 | A1* | 12/2010 | Li et al. | 382/173 |
| 2011/0211754 | A1* | 9/2011 | Litvak et al. | 382/165 |
| 2011/0301934 | A1* | 12/2011 | Tardif | 704/1 |

FOREIGN PATENT DOCUMENTS

WO    WO 2012115819 A1 *  8/2012

OTHER PUBLICATIONS

Forsyth, D. A. et al.: "Computational studies of human motion: Part 1, tracking and motion synthesis", 2006.
Metaxas, D., and Terzopoulos, D.: Shape and nonrigid motion estimation through physics-based synthesis. PAMI 15, Jun. 6, 1993, 580-591.
Wren, C. R., and Pentland, A.: "Dynamic models of human motion. In Automatic Face and Gesture Recognition", 1998.
(Continued)

*Primary Examiner* — Utpal Shah
*Assistant Examiner* — Mai Tran
(74) *Attorney, Agent, or Firm* — Patterson & Sheridan, LLP

(57) ABSTRACT

The disclosure provides an approach for estimating a state-space controller from a set of video frames depicting a motion of an entity. The approach includes incrementally optimizing parameters of the state-space controller and changing a structure of the state-space controller based on expanding subsets of the set of video frames. In one embodiment, a controller-estimation application greedily selects, at every stage of the incremental optimization, structure and parameters of the controller which minimize an objective function. In another embodiment, the controller-estimation application re-optimizes, after the incremental optimization, all parameters of the state-space controller based on all of the video frames. In yet a further embodiment, the controller-estimation application alters the structure of the state-space controller for robustness and compactness by adding cycles in the state-space controller and enforcing constraints on the structure of the state-space controller and adding and modifying state transition types, as appropriate.

20 Claims, 4 Drawing Sheets

(56) References Cited

OTHER PUBLICATIONS

Brubaker, M. A., et al.: "Physics-based person tracking using simplified lower body dynamics", CVPR, 2007.
Brubaker, M. A., and Fleet, D. J.: "The Kneed Walker for human pose tracking", In CVPR, 2008.
Vondrak, M., et al.: "Physical simulation for probabilistic motion tracking", CVPR, 2008.
Wei, X., and Chai, J.: "Videomocap: Modeling physically realistic human motion from monocular video sequences", ACM Transactions on Graphics 29, 4, 2010.
Witkin, A., and Kass, M.: "Spacetime constraints", ACM SIGGRAPH, 159-168, 1998.
Liu, C. K., et al.: "Learning physics-based motion style with nonlinear inverse optimization", ACM Transactions on Graphics 24 (Jul.), 2005.
Silva, M. D., et al.: "Interactive simulation of stylized human locomotion", ACM Transactions on Graphics 27, 3, 2008.
Muico, U., et al.: "Contact-aware nonlinear control of dynamic characters", ACM Transactions on Graphics 28, 3, 2009.
Hodgins, J. K., et al.: "Animating human athletics", In ACM SIGGRAPH, 71-78, 1995.
Yin, K. Loken, K. and Van De Panne, M.: "Simbicon: Simple biped locomotion control", In ACM SIGGRAPH, 2007.
Chu, D., et al.: "A dynamic controller toolkit", In ACM Siggraph Video Game Symposium (Sandbox), 21-26, 2007.
Coros, S., et al.: "Robust task-based control policies for physics-based characters", In ACM SIGGRAPH Asia, 2009.
Wang, J., et al.: "Optimizing walking controllers", In ACM SIGGRAPH Asia, 2009.
Wang, J., et al.: "Optimizing walking controllers for uncertain inputs and environments", In ACM SIGGRAPH, 2010.
Yin, K., et al.: "Continuation methods for adapting simulated skills", ACM SIGGRAPH, 2008.
Cline, M.: "Rigid Body Simulation with Contact and Constraints", Master's thesis, The University of British Columbia, 2002.
Dempster, W. T.: "Space requirements of the seated operator: Geometrical, kinematic, and mechanical aspects of the body with special reference to the limbs", Tech. rep., Wright-Patterson, Air Force Base 55-159, 1955.
Elgammal, A., et al.: "Non-parametric model for background subtraction", In European Conference on Computer Vision (ECCV), 2000.
Brubaker, M.A., et al.: "Physics-Based Person Tracking Using the Anthropomorphic Walker" International Journal of Computer Vision, 2009.
Hansen, N.: "The cma evolution strategy: A comparing review", Towards a New Evolutionary Computation. Advances on Estimation of Distribution Algorithms, 75-102, 2006.
Lee, Y., et al.: "Data-driven biped control", ACM Transactions on Graphics, 2010.
Schaal, S., and Schweighofer, N.: "Computational motor control in humans and robots", Cur. Opinion in Neurobiology, 6, 2005.
Sigal, L., et al.: Int. Journal of Computer Vision 87, 1-2, 4-27, 2010.

\* cited by examiner

VIDEO-BASED MOTION CAPTURE AND ADAPTATION

BACKGROUND

1. Field

Embodiments presented herein provide techniques for video-based motion capture and adaptation. More specifically, embodiments presented herein disclose techniques for estimating control mechanisms and parameters for a physics-based model from recorded video.

2. Description of the Related Art

A variety of motion capture techniques (e.g., via optical marker-based systems) have been developed to create natural-looking virtual characters. Typically, motion capture requires a carefully instrumented and calibrated laboratory environments, as well as instrumentation of an actor being captured. Alternatively, motion capture may be based on video. However, motion captured from video must often be modified in non-trivial ways to make it physically correct and a good match to a dynamic virtual model of a character in 3D. This occurs because recorded video only presents 2D information, i.e., recorded video lacks depth. Some current video-based motion capture systems rely on statistical models that create unrealistic visual artifacts, including footskate and out-of-plane rotations that violate gravity and balance. Other video-based motion capture systems require human intervention. No current video-based motion capture system allows captured motions to be realistically adapted to different 3D environments.

SUMMARY

One embodiment of the invention includes a computer implemented method for estimating a state-space controller from a set of video frames depicting a motion of an entity. The method includes receiving the set of video frames and initializing the state-space controller, which includes states corresponding to an atomic controller and transitions between the states. The method further includes incrementally optimizing parameters of the state-space controller and changing the structure of the state-space controller to approximate through simulation the motion as depicted in an initial subset of the video frames and in expanded subsets of the video frames. At each stage of the incremental optimization, parameters of the last one or more states of the state-space controller may be optimized.

Other embodiments include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
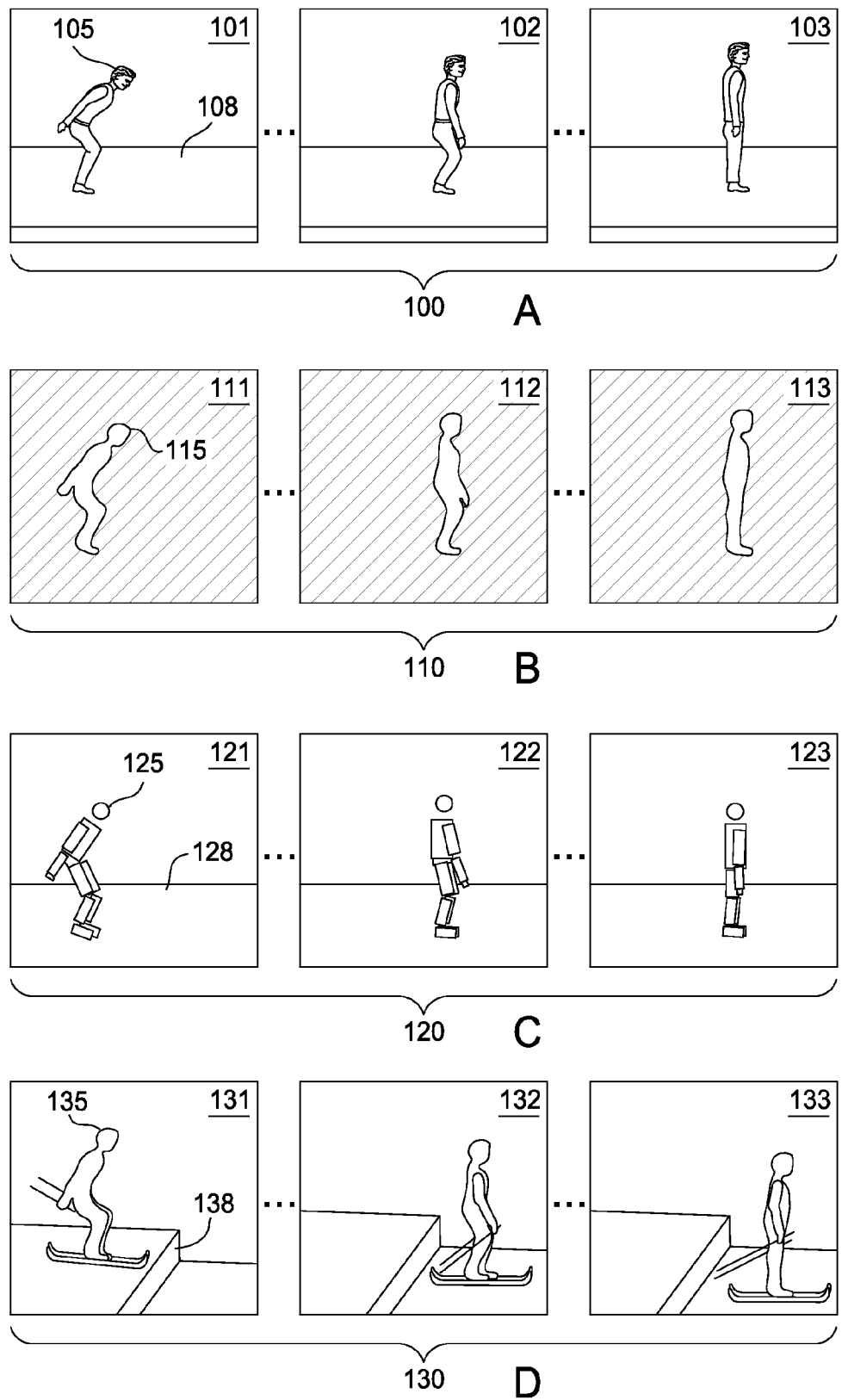
FIG. 1 illustrates an approach for video-based motion capture, according to an embodiment of the invention.

Embodiments disclosed herein provide techniques for estimating a state-space controller from a set of video frames depicting a motion of an entity. The techniques include incrementally optimizing parameters of the state-space controller and changing a structure of the state-space controller based on expanding subsets of the set of video frames. In one embodiment, a controller-estimation application greedily selects, at every stage of the incremental optimization, structure and parameters of the controller which minimize an objective function. In another embodiment, the controller-estimation application re-optimizes, after the incremental optimization, all parameters of the state-space controller based on all of the video frames. In yet a further embodiment, the controller-estimation application alters the structure of the state-space controller by adding cycles in the structure, adding and/or modifying state transition types where appropriate, and/or enforcing other constraints on the structure. Doing so may improve the robustness and compactness of the resulting controller. Using the estimated state-space controller, a virtual character or physical robot may simulate the motion in an environment which differs from that depicted in the video frames.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

FIG. 1 illustrates an approach for video-based motion capture through biped control, according to one embodiment. As shown in panel A, a video sequence 100 beginning with video frame 101 and ending with video frame 103 depicts a jumping motion. Illustratively, the jumping motion is performed by a person 105 in an environment having a flat surface 108.

Panel B shows the result of pre-processing of the video sequence 100. Illustratively, binary foreground silhouettes 115 are extracted. For example, a standard background-subtraction algorithm may be used to perform the extraction, with the background model including mean color image and intensity gradient, along with a single 5D covariance matrix estimated over each frame. Of course, other background subtraction algorithms may also be used, including those that adapt to changes in illumination.

As shown in panel C, a state-space controller is estimated for simulating the motion in the video sequence. As used herein, "state-space controller" includes a set of target states of a character; transitions among the states, if any, which may be triggered on time, contact, or other events. The "state-space controller" may also include various parameters which indicate, e.g., how fast the states are approached and how actively the character attempts to balance itself while reaching the states. The "structure" of the controller includes the number of states (e.g., 4 states) and the types of transitions between them. In general, the structure may indicate at a coarse level the nature of the motion. "Parameters" of the controller include the actual states, the speed at which the states are reached, how actively the character balances, and the like. In general, the parameters may describe finer aspects of the motion given a controller structure.

The human body, its actuation, and interactions with the environment may be modeled as follows. The 3D kinematic pose of an articulated human skeleton (also referred to herein as the "body") at time t may be represented by a state vector $x_t = [\rho_t, q_t]$, where ($\rho_t$) is the root position and root vector $q_t = [q_t^r, q_t^k]$ is an encoding of the angular configuration of the body that combines joint angles $q_t^k$ and the root orientation $q_t^r$. The time derivative $\dot{x}_t$ of the kinematic pose characterizes the speed with which the body moves and together with the kinematic pose $x_t$ defines a dynamic pose $[x_t, \dot{x}_t]$. A mapping of the dynamic pose $[x_t, \dot{x}_t]$ of the human skeleton at time t to the dynamic pose $[x_{t+1}, \dot{x}_{t+1}]$ at a later time t+1 produces the motion of the body and may be determined using articulated rigid-body dynamics and integration. Such a mapping may be expressed as follows:

$$[x_{t+1}, \dot{x}_{t+1}] = f([x_t, \dot{x}_t], \tau_t) \qquad (1)$$

Here, the function $f$ may be a numerical approximation of a continuous integration of internal joint torques $\tau_t$ with respect to the current dynamic pose $[x_t, \dot{x}_t]$.

Using the foregoing model, a state-space controller may be estimated for actuation of the body. In one embodiment, the controller may break down control into a sequence of simple atomic actions, transitions between which occur on events such as time or contact. For each action, a constraint-based action controller may be estimated for driving the simulated character towards a predefined pose associated with the action. However, other forms of control for actions are possible, e.g., proportional-derivative (PD) and proportional-integral-derivative (PID) servo controllers. More formally, joint torques $\tau_t$ of equation (1) are produced by the controller:

$$\tau_t = \pi([x_t, \dot{x}_t], S_M, \ominus), \qquad (2)$$

where $S_M$ is the structure of the controller, M is the number of states in the control structure, and $\ominus$ is a vector of control parameters. A controller structure $S_M$ induces a family of controllers in which the parameters $\ominus$ define the behavior of the controller. Here, simulation of the motion includes iteratively applying equations (1) and (2), resulting in a sequence of kinematic poses $x_{1:T}$. Because this formulation is recursive, an initial kinematic pose $x_0$ and velocities $\dot{x}_0$ may be used to bootstrap integration.

The state-space controller may be estimated via optimization to determine the controller structure $S^*_M$, parameters $\ominus^*$, initial pose $x^*_0$, and initial velocities $\dot{x}^*_0$ that minimize the inconsistency of poses produced by dynamic simulation (integration) with image observations (or reference motion capture). In one embodiment, a controller-estimation application optimizes an energy function $E(z_{1:T})$:

$$[S^*_M, \ominus^*, x^*_0, \dot{x}^*_0] = \arg\min_{S_M, \ominus, x_0, \dot{x}_0} E(z_{1:T}) \qquad (3)$$

Here, the energy function $E(z_{1:T})$ may measure the inconsistency of the simulation produced by the controller with image-based (or reference motion capture) observations $z_{1:T}$ and further measures the quality of the controller itself in terms of robustness and stability. In one embodiment, optimizing controller structure and parameters may include iterative optimization of the structure with batch optimization over controller parameters as a sub-routine, as discussed in greater detail below. In another embodiment, the controller-estimation application may refine the structure of the controller by, e.g., applying structural transformations and re-optimizing the parameters.

In one embodiment, the estimated controller may be used to simulate the motion of the human 105 depicted in the video sequence 100. As discussed, such a simulation may include iteratively applying equations (1) and (2), resulting in a sequence of kinematic poses $x_{1:T}$. In general, a virtual character 125 or physical robot may be made to replay the motion in environments that differ from (or do not differ from) that of the video sequence 100. Illustratively, Panel D depicts a virtual environment 138 in which the surface is uneven and the friction coefficient of the surface has been adjusted to simulate a snowy surface. As shown, the virtual character 125 has also been attached to skiing equipment. When the motion is simulated under such circumstances, the virtual character 125 may perform a ski jump.

Figure 2:
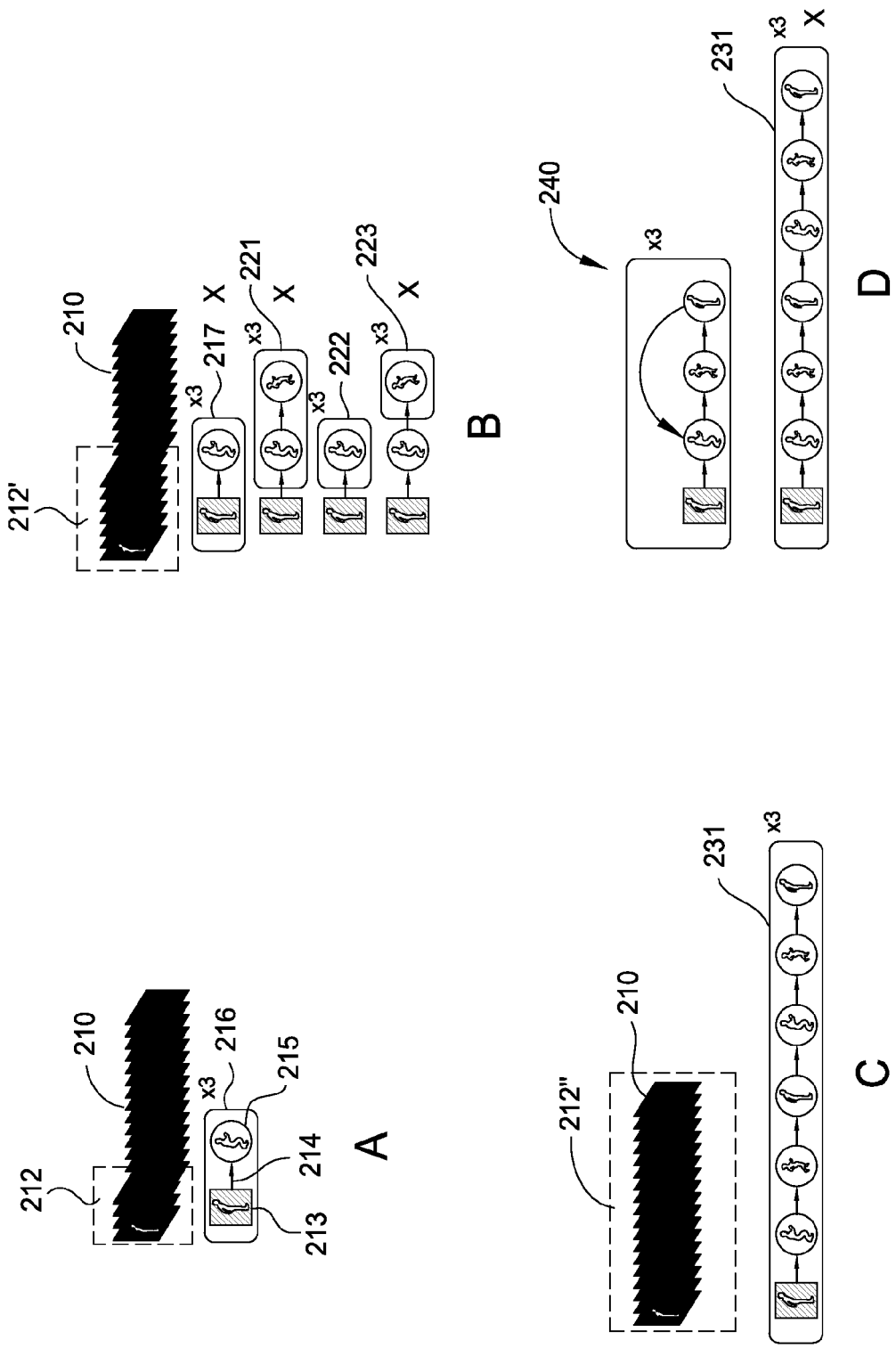
FIG. 2 illustrates incremental optimization of a state-space controller, re-optimization of the controller, and refinement of the structure of the controller, according to an embodiment of the invention.

FIG. 2 illustrates incremental optimization of a state-space controller, re-optimization of the controller, and refinement of the structure of the controller, according to an embodiment. As shown in panel A, a first subset 212 of a set of pre-processed video frames 210 is analyzed.

In one embodiment, the human body may be encoded using 18 rigid body segments, with upper and lower segments for arms and legs, hands, two-segment feet, three segment torso, and a head. In such a case, the center of mass and inertial properties of such segments may be derived, e.g., based on known weight and rough proportions of the subject in the video sequence, as well as biomechanical averages. Each segment may be parameterized by position and orientation in 3D space and have associated collision geometry/rigid body made up of geometric primitives (e.g., spheres, capsules, and boxes). Various physical and environmental restrictions may be imposed on the body and encoded using constraints which include, but are not limited to, (1) joint constraints that ensure segments stay attached at the joints and only have certain degrees of freedom (e.g., knees and elbows are 1 degree-of-freedom hinge joints), (2) joint limit constraints that ensure that unconstrained degrees of freedom are only allowed to actuate within allowable ranges (e.g., ranges that prevent hyperextension at knee and elbow joints); and (3) body segment non-penetration constraints and environmental constraints (e.g., modeling contact and friction). Given the foregoing simulator-level constraints, the state $x_t=[\rho_t, q_t] \in \mathbb{R}^{40}$, which includes joint angles and a root position and orientation, is the relevant state for purposes of actuation and control, even though the simulation state of the character is $\in \mathbb{R}^{108}$. Note, $x_t$ spans the null space of the joint constraints. Depending on the choices made for the various joints of the body (e.g., hinge, ball-and-socket, etc.), the dimensionality of $x_t$ may be different.

The joint constraints may be combined in a system of equations, which can be expressed as a mixed linear complementarity problem (Mixed LCP). Well-known Mixed LCP solvers may be used to solve such problems, yielding a set of forces and torques required to satisfy the constraints. Note, the degrees of freedom corresponding to the joint angles must be actuated to produce voluntary motions for the body.

For actuation, a controller may be formulated using constraints and the constraints may be directly integrated with the body and simulator-level constraints discussed above. In one embodiment, the Mixed LCP problem may be solved taking the actuation torques into account to ensure that constraint forces anticipate the impact of actuation on the system. In another embodiment, a PD or PID controller may be used instead for actuation.

In one embodiment, the controller may be a state space controller as discussed above. In such a case, a motion may be expressed as a progression of simple control tasks (actions). That is, the controller may include two distinct entities: (1) atomic control actions, and (2) transitions between the actions that are triggered on timing or events. Each atomic control action may consist of joints applying torques, computed via e.g., proportional-derivative control, that drive the joints to the desired local angles of a target pose represented by a desired set of joint angles. Note, the target pose may not be achieved precisely. For example, one control action for a walking motion may include a target pose associated with a state in which a swing leg of the body is extended beyond physical limits. By driving the joints to achieve the target pose, the swing leg may be extended down and backwards, thereby causing the swing leg to come into contact with the ground. The contact event may further cause a transition to the next atomic control action of the walking motion (e.g., one in which the other leg becomes the swing leg and where driving the joints to achieve the target pose causes the leg to lift and swing forward).

Formally, state-space controllers may be expressed as finite state machines with states corresponding to atomic control actions. As discussed, such a controller may include a set of M states and transitions between the states that are time or event driven. Advantageously, the controller allows a concise representation of motion dynamics through a sparse set of target poses and parameters. The use of the sparse representation allows more robust inference that is less biased by noise in individual video frames. Despite the sparse nature of the representation, the controller still allows sufficient expressiveness to model variations in style and speed that may be observed in the video sequence.

A state-space controller may be defined by its structure and parameters. Let the structure of the controller be denoted by $S_M$, the actions of the controller by $\odot_i$, and the transitions between the actions by $\kappa_i$, $i \in [1, M]$ (e.g., $\kappa_i=0$ being a transition based on time, $\kappa_i=1$ being a transition based on left foot contact, $\kappa_i=2$ being a transition based on right foot contact, etc.). Transitions on time may occur once the simulation time spent in state i is $\geq v_i$. By contrast, transitions on contact events may occur when the simulator detects that the contact event has happened. For example, the structure of a controller for a walking cycle having four states may look like:

$$S_4 = \left\{ \bigoplus \rightarrow \odot_1 \xrightarrow{\kappa_1=1} \odot_2 \xrightarrow{\kappa_2=0} \odot_3 \xrightarrow{\kappa_3=2} \odot_4 \right\}.$$

Further, let the parameters of the controller be expressed as $\Theta=[(s_1, \theta_1, \sigma_1), (s_2, \theta_2, \sigma_2), \ldots, (s_M, \theta_M, \sigma_M), v_1, v_2 \ldots]$, where $s_i$ is the representation of the target pose for the angular configuration of the body that the controller tries to achieve in state $\odot_i$; $\theta_i$ and $\sigma_i$ are parameters of the corresponding control and balance laws, respectively, used to achieve the pose; and $v_i$ are transition timings for those states where transitions happen on time (i.e., $\kappa_i=0$).

As discussed, the controller may include atomic controllers which produce torques necessary to drive the pose of the character towards target poses $s_i$ of each of the states $\odot_i$. The values of control parameters $\theta_i$, which encode, e.g., the speed at which target poses should be reached, may be used to set up control laws. In one embodiment, the atomic controllers may be formulated based on constraints. In particular, assuming the body is currently in pose $x_t$ and that the controller is executing an atomic control due to state $\odot_i$, the atomic controller may be formulated using constraint stabilization, where the stabilization mechanism tries to reduce the difference between the target pose and the current pose using constraints on the angular velocity of the root degrees of freedom (DOFs) r and non-root DOFs k:

$$\{\dot{q}_t^r = -\alpha_i^r (q_t^r - g(s_i)^r)\} \quad (4)$$

$$\{\dot{q}_t^k = -\alpha_i^k (q_t^k - g(s_i)^k)\} \quad (5)$$

These constraints may be combined with all other constraints to solve for the required torques in the Mixed LCP problem discussed above. The set of control parameters is then $\theta_i=\{\alpha_i\}$. In one embodiment, the number of control parameters may be reduced by assuming left-right-parameter symmetry such that a's are optimized for one side of the body and reused for the other side.

Note, the foregoing constraint-based approach is different from commonly-used proportional derivative (PD)-servos. Intuitively, a PD-servo assumes that control torques are linear functions of the differences between the current and target poses of a body. The PD-servo further assumes that each degree of freedom can be controlled independently and relies on a feedback mechanism to resolve interactions within the system. In contrast, the constraint-based approach described herein solves for torques necessary to approach a target pose by explicitly taking into account constraints present among rigid body segments and the environment. In addition, parameters $\alpha_i$ may modulate the pose difference to be reduced in one simulation step where, e.g., the target pose is not to be reached immediately. Advantageously, the more exact control and lesser reliance on feedback permits simulation at lower frequencies (e.g., 120 Hz).

In one embodiment, the controller estimation application may limit the solutions to the Mixed LCP so that super-human forces are not applied. In particular, the torques generated about individual joint axes may be limited, where a joint is defined between segments i and j having masses $m_i$ and $m_j$, using a single parameter $$\gamma: -\gamma\frac{m_i + m_j}{2} < \tau_t^{axis} < \gamma\frac{m_i + m_j}{2}.$$

Intuitively, these bounds permit heavier body segments containing larger muscle volumes to apply larger torques about joints. To account for the fact that the segments i and j connected at the joint may have different masses, an average $$\frac{m_i + m_j}{2}$$

is taken, thereby providing an approximation to an answer that would take into account moment of inertia of the controlled limb.

In one embodiment, the model ensures that the net torque on the root segment is exactly equal and opposite to the sum of torques of all connected segments, thereby ensuring consistency with Newton's physical laws. Here, an additional constraint of the following form is required:

$$\{\tau_t^r + \Sigma_{k \in Neigh(r)} \tau = 0\}. \quad (6)$$

Such a constraint may be accounted for via an approximate two-pass inverse dynamics solution that decomposes the torques unaccounted for at the root to the torques applied at the thighs according to the following pseudo-code:
Application of Control Forces

---

1: Solve for $\tau_t$ using inverse dynamics to satisfy Eq. (4) and Eq. (5) and apply $\tau_t$
2: Determine by how much Eq. (6) is violated: $\tau_{error}{}^r = \tau_t{}^r + \Sigma_{k \in Neigh(r)} \tau_t{}^k$
3: Apply $-\tau_{error}{}^r$ to the swing upper leg
4: Solve for $\tau_t$ using inverse dynamics to satisfy Eq. (5) and apply $\tau_t$

---

In another embodiment, the two-pass inverse dynamics algorithm may be extended to a multi-pass algorithm where steps 1-4 in the pseudo-code above are repeated multiple times.

Constraints on the root segment, as discussed above, will attempt to maintain the world orientation of the body. In one embodiment, an active feedback mechanism may be added to prevent falling when the environment differs from one that is expected by the controller or there are perturbations in the environment. In particular, the feedback mechanism may dynamically adjust the target orientation of a swinging upper leg based on the horizontal offset of the body's center of mass (COM) from the body's center of pressure (COP), resulting in three additional control parameters encoded into a vector $\sigma_i \in \mathbb{R}^3$. Here, the feedback mechanism may affect the motion of the swinging foot so as to return the character to a balanced pose where the COM is above the COP. In one embodiment, the feedback may be implemented by synthesizing a new target orientation for the swinging upper leg such that the leg's medial axis points along the ground plane projection of the direction $d=\sigma_{i,1}(COM-COP)+\sigma_{i,2}(C\dot{O}M-C\dot{O}P)$ and blending between this orientation and the actual orientation from the current state with the weight $\sigma_{i,3}$. Other forms of active feedback are also possible.

In one embodiment, a dimensionality reduction technique may be used to reduce the search space of poses. In such a case, target poses for the body are represented in a low-dimensional manifold of poses likely for the motion. Dimensionality reduction techniques include Principal Component Analysis (PCA), Kernel-PCA, Gaussian Process Latent Variable Models, Gaussian Processes Dynamic Models, among others. When a PCA prior is used to represent poses, PCA representation $s_i$ of the target pose may be mapped to the joint angle representation $q_i$ using a function $g(s_i)$ defined as:

$$g(s_i)=Us_i+b. \quad (7)$$

The controller-estimation application may learn the linear basis U from training motion capture data using singular value decomposition (SVD). PCA coefficients for $s_i$ in the parameter vector $\ominus$ may be stored. For example, coefficients for principal components may be stored to account for 95% of the variance in the data.

As discussed, use of PCA representation of poses may reduce the dimensionality of the pose search space, thereby leading to faster and more robust convergences. In one embodiment, a uniform prior may be added on $s_i$ such that coefficients are within $\pm 4\sigma$. Similarly, the initial kinematic pose may be encoded in the same PCA space so that $x_0=Us_0+b$. In such a case, $s_0$ may be optimized rather than $x_0$ directly.

In a further embodiment, PCA priors from marker-based motion capture may be obtained to generate a family of models $\{U_i, b_i\}$, where i is over a set of activities (e.g., walking, jumping, spin kicking, back handspring, cartwheel, etc.) as well as an activity-independent model $\{U_0=I_{40 \times 40}, b_0=0_{40}\}$. At test time, the controller-estimation application may perform optimization with each model, and the controller-estimation application may select the resulting controller that best fits observations according to the objective function $E(z_{1:T})$.

Based on the foregoing body model and actuation, the controller-estimation application may perform incremental optimization of the controller's structure in stages. Any feasible type of incremental optimization may be used, including genetic search algorithms and sampling-based optimization algorithms. In one embodiment, the structure of the controller may be estimated locally and simultaneously along with estimation of control parameters. At the first optimization stage, a first subset of pre-processed frames 212 having $T_s$ frames are used for optimization of the controller's 216 parameters $\ominus$, initial pose $x_0$, and the initial velocities $\dot{x}_0$. Here, for initialization of the optimization, the controller-estimation application may assume generic initial pose and velocities $\dot{x}_0$ and an initial structure with one state, $S_1=\{\oplus \rightarrow \odot_1\}$.

As shown in panel B, a subsequent $T_s$ frames from the video sequence (or reference motion capture) are added to the initial $T_s$ frames, and the controller is optimized again assuming the same initial structure $S_1=\{\oplus \rightarrow \odot_1\}$ to produce controller 217. Further, the controller-estimation application may propose an additional state as an update to the controller's structure. As shown, controllers 221 and 223 include an additional state. In one embodiment, the controller-estimation application may optimize one or more of the last states of the controllers being analyzed at any given incremental optimization stage, thereby ensuring a fixed compute time even as the number of states increases. Illustratively, two states are optimized in controller 221, whereas one state is optimized in controller 223. Similar to controller 223, optimization is performed on one state of controller 222. In one embodiment, optimization minimizes an objective function with respect to controller parameters $\Theta$, initial pose $x_0$, and initial velocities $\dot{x}_0$ given a controller structure $S_M$. The controller-estimation application selects the controller associated with the lowest (or highest in alternative embodiments) objective value out of controllers 217 and 221-223. That is, at every stage of incremental optimization, the controller-estimation application optimizes controller parameters $\Theta$, initial pose $x_0$, and initial velocities $\dot{x}_0$, for one or more last states of proposed controllers. The controller-estimation application then greedily selects the controller associated with the best objective value.

As shown in panel C, after incremental optimization, the controller-estimation application may re-optimize all parameters of the controller in a batch, taking into account all frames of the video sequence 210. As discussed, parameters for one or more last controller states may be optimized during each incremental optimization stage. By contrast, re-optimization optimizes all parameters of each state of the controller structure. In one embodiment, re-optimization may be optional, as the compute time for optimizing all parameters based on all video frames may be prohibitively large in some cases.

As shown in panel D, the structure chosen based on incremental optimization is refined for robustness, and controller parameter values are re-estimated via batch optimization given proposed structural refinements. In general, proposed structural refinements may include, but are not limited to, adding loops or enforcing constraints (e.g., avoiding contact) and adding or modifying transition types (e.g., modifying a transition based on time to a transition based on contact). For example, the motion in video sequence 210 is substantially repeated in that two jumps are made. As a result, the controller-estimation application may modify the structure 231 to include a loop. In general, various modifications may be proposed, and the modified structure which best fits the observed motion or has certain desired properties (e.g., stability, compactness, etc.) may be chosen. Illustratively, parameters for the modified structure 240 are re-estimated via batch optimization, and if the objective value is, e.g., within some error tolerance of the objective value for the structure 231 and also smaller (or larger, in some embodiments) than the objective values for other proposed refinements, then the controller-estimation application may choose the modified structure 240 over the original structure 231.

Figure 3:
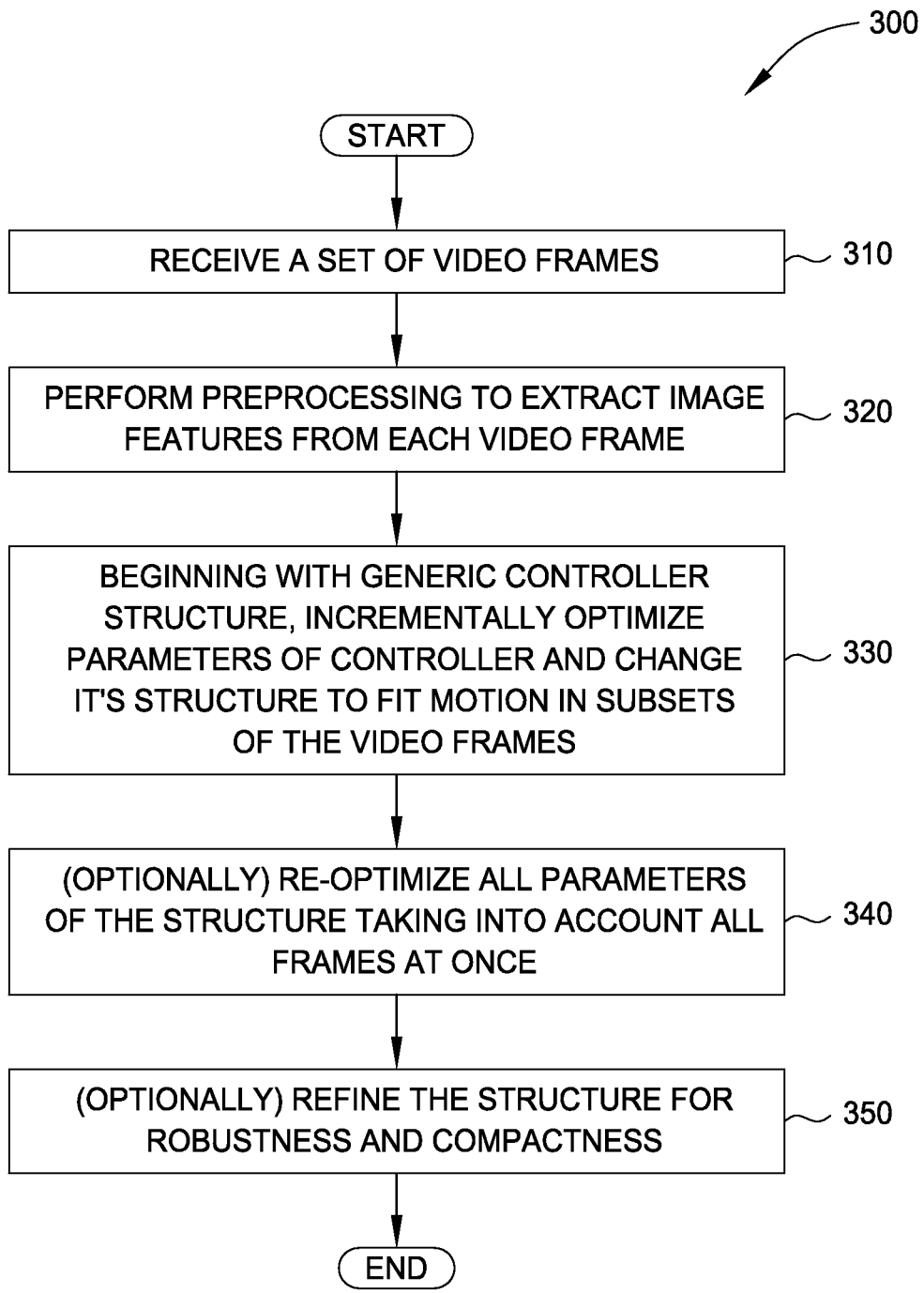
FIG. 3 illustrates a method for estimating a state-space controller from monocular video, according to an embodiment of the invention.

FIG. 3 illustrates a method 300 for estimating a state-space controller from monocular (i.e., two-dimensional) video, according to an embodiment. As shown, the method 300 begins at step 310, where a controller-estimation application receives a video sequence which includes a set of video frames. At step 320, the controller-estimation application performs pre-processing to extract image features from each video frame. The extracted image features may include foreground, edges, color, texture, and motion capture marker locations. In one embodiment, pre-processing extracts foreground silhouettes like those depicted in Panel B of FIG. 1. In a further embodiment, the video sequence or foreground silhouettes may be sub-sampled to reduce computation time.

At step 330, the controller-estimation application incrementally optimizes the parameters of a controller and changes the controller's structure to fit the motion in increasingly larger subsets of the set of video frames, beginning with a generic controller structure. In one embodiment, the controller-estimation application may greedily select controller structure and parameters as new observations are added, thereby avoiding a difficult high-dimensional batch optimization problem over the entire video sequence, and instead solving easier lower-dimensional optimization problems over an expanding motion window. Experience has shown that optimization results over a motion window can provide a good initialization for local optimizations over a subsequently expanded window. In one embodiment, the motion window may simply begin with a first subset $T_s$ of pre-processed video frames of the video sequence. At each later stage of incremental optimization, the current motion window may be expanded by subsequent $T_s$ frames from the pre-processed video sequence.

To obtain a controller that approximates the motion in the video frames (or in reference motion capture), the controller-estimation application may estimate both the structure of a controller for the motion $S_M$ (including number of states M and the types of transitions $\kappa$ among them), parameters $\Theta$ of the controller optimized to fit the observations, and initial pose $x_0$ and velocities $\dot{x}_0$. Such an optimization may include optimizing an objective function, such as that of equation (3), with respect to $S_M$, $\Theta$, $x_0$, and $\dot{x}_0$. In one embodiment, the objective function may be $$E(z_{1:T})=\lambda_l E_{like}+\lambda_s E_{stab}+\lambda_p E_{prior}+\lambda_c E_{cont}, \quad (8)$$

where $E_{like}$ measures inconsistency of the simulated motion produced by the controller and image-based (or reference motion capture) observations, $E_{stab}$, $E_{prior}$, and $E_{cont}$ measure the quality of the controller itself, and the coefficients $\lambda_i$ are weighting factors designating the overall importance of the various terms.

In equation (8), the energy term $E_{like}$ measures the inconsistency between the simulated motion and the image observations $z_{1:T}$, which may include, e.g., foreground silhouettes. Assuming the likelihood is independent at each frame, the simulated motion $x_{1:T}$ may be measured for inconsistency with the image observations by adding up contributions from each frame. In one embodiment, the controller-estimation application measures the inconsistency in each frame by projecting a simulated character into the image (assuming a known camera projection matrix) and computing the difference between the projection and the pre-processed frame on a per-pixel basis. In such a case, the controller-estimation application may, for example, determine a symmetric distance between an estimated binary silhouette for the projection $S_t^e$ and a binary foreground silhouette for the frame $S_t^i$. This results in the following formulation for the energy term $E_{like}$:

$$E_{like} = \sum_{t=1}^{T} \frac{B_{t,t}}{B_{t,t}+Y_{t,t}} + \frac{R_{t,t}}{R_{t,t}+Y_{t,t}} \quad (9)$$

where $R_{t,s} = \Sigma_{(x,y)} S_t^i(x,y)[1-S_s^e(x,y)]$, $B_{t,s} = \Sigma_{(x,y)} S_s^e(x,y)[1-S_t^i(x,y)]$, and $Y_{t,s} = \Sigma_{(x,y)} S_t^i(x,y) S_s^e(x,y)$.

In an alternative embodiment in which reference motion capture data is used instead of video data, the energy term $E_{like}$ may be defined as a sum of squared differences between markers attached to the observed skeleton and markers on the simulated body. For example, where three markers are attached to each body segment, $E_{like}$ may be $$E_{like} = \Sigma_{t=1}^{T} \Sigma_{j=1}^{18} \Sigma_{k=1}^{3} \|m_{t,j,k}^i - m_{t,j,k}^e\|_2^2 \qquad (10)$$

where $m_{t,j,k}^i \in \mathbb{R}^3$ is the location of the k-th observed marker attached to the j-th segment at time t (computed from the reference motion capture pose via forward kinematics) and $m_{t,j,k}^3 \in \mathbb{R}^3$ is the location of the k-th marker attached to the j-th segment at time t of the simulated character obtained by simulating the controller with parameters $\Theta$.

In equation (8), the energy term $E_{stab}$ measures the inconsistency between the simulation for time $\Delta T$ past time $T$, where $T$ is the time of the last observation, and the last observation. Here, the controller-estimation application assumes that the person depicted in the video sequence should end up in a stable (as opposed to an unstable) posture at the end of the simulation, and the energy term $E_{stab}$ is used to ensure such a stable posture. In one embodiment, $E_{stab}$ may be defined as $$E_{stab} = \sum_{t=T+1}^{T+\Delta T} \frac{B_{T,t}}{B_{T,t} + Y_{T,t}} + \frac{R_{T,t}}{R_{T,t} + Y_{T,t}}. \qquad (11)$$

In equation (5) energy term $E_{prior}$ is used to bias solutions towards more likely possibilities based on a prior over the state-space control parameters. In one embodiment, the controller-estimation application optimizes four types of parameters: representation of target poses for atomic controllers $s_i$, parameters of atomic controllers $\alpha_i$, transition times $v_i$, and balance feedback parameters $\sigma_i$; in addition, the controller-estimation application may also optimize initial pose $x_0$ and velocities $\dot{x}_0$. For $\alpha_i$, $v_i$, and $\sigma_i$, uninformative uniform priors may be used over ranges of possible values, such as: $\alpha_i \sim U(-0.001, 0.2)$, $v_i \sim U(-0.1, 0.5)$, $\sigma_{i,1} \sim U(-1,1)$, $\sigma_{i,2} \sim U(-1,1)$, and $\sigma \sim U(0,1)$. Uniform priors may also be imposed on $s_i$, $s_i \sim U(-4\sigma, 4\sigma)$. In one embodiment, uniform priors over parameters may be encoded using a linear penalty on values of parameters that are outside the valid ranges. In particular, for every variable $v$, above, having a uniform prior $v \sim U(a,b)$, the following term may be added to the prior: $E_{prior}(\Theta)$:|max (0,v-b)|+|min (0,v-a)|.

In equation (8), the energy term $E_{cont}$ imposes a contact state change penalty. Here, a contact state change may include one or more body segments changing their contact state(s) with respect to the environment (i.e., the environment ceases to apply forces, or vice versa). Experience has shown that controllers optimized without using the energy term $E_{cont}$ may make frequent contact changes between body segment(s) and environment, especially for low-clearance motions like walking. For example, a walking controller may stumble slightly if that helps to produce a simulated motion that is more similar to the motion depicted in the pre-processed video or reference motion capture. However, such behavior hinders the ability of the controller to be robust to perturbations in the environment. One embodiment addresses this issue by requiring that there be no more than one (i.e., zero or one) state change between two consecutive atomic actions. Such an approach is motivated by the observation that contact state change creates discontinuity in the dynamics and hence should be accompanied by a state transition; however, state transition may happen for other reasons (e.g., performance style). In one embodiment, the energy term $E_{cont}$ may be defined as $E_{cont} = \Sigma_{i=1}^{M-1} c(i)$, where $$c(i) = \begin{cases} 0 & \text{if 0 or 1 contact changes between } \Theta_i \text{ and } \Theta_{i+1} \\ \text{LARGE\_CONST} & \text{if } > 1 \text{ contact changes between } \Theta_i \text{ and } \Theta_{i+1}, \end{cases} \qquad (12)$$

and LARGE_CONST is a large real-valued constant (e.g., 10,000).

Given the objective function of equation (5), the controller of interest may be obtained by optimizing the objective with respect to $S_M$, $\Theta$, $x_0$, $\dot{x}_0$. In one embodiment, the controller-estimation application uses gradient-free Covariance Matrix Adaptation (CMA) algorithm. CMA is an iterative genetic optimization algorithm that maintains a Gaussian distribution over parameter vectors. The Gaussian may be initialized with mean $\mu$ and a diagonal spherical covariance matrix with variance along each dimension equal to $\sigma^2$. CMA may then proceed by: (1) sampling a set of random samples from the Gaussian; (2) evaluating the objective $E(x_{1:T})$ for each of those samples; and (3) producing a new Gaussian based on the most promising samples and the mean. The number of samples to be evaluated and used for the new mean may be automatically chosen by CMA based on the dimensionality of the problem.

Using CMA, the controller-estimation application may run batch optimization of control parameters for a given state-space controller structure. Batch optimization determines control parameters $\Theta = [(s_1, \theta_1, \sigma_1), (s_2, \theta_2, \sigma_2), (s_M, \theta_M, \sigma_M), v_1, v_2 \ldots]$ and initial pose $x_0$ and velocities $\dot{x}_0$ by minimizing the value of the objective function $E(z_{1:T})$. Experience has shown that batch optimization is useful where a reasonable guess exists for the controller structure. Further, batch optimization of cyclic controllers may be particularly beneficial because weak observations for one motion cycle can be reinforced by evidence from other cycles, thereby making the optimizations less sensitive to observation noise and less prone to overfitting to local observations. In one embodiment, batch optimization may be implemented according to the following pseudo-code:

```
[Θ, x₀, ẋ₀, E] = BatchOp(S_M, x₀, Z, U, b, Θ, ẋ₀)

Input: State-space controller structure (S_M); initial pose (x₀); PCA
prior (U, b); observations (image features) (Z = {z₀, z₁, ..., z_T})
Opional input: Controller parameters (Θ); initial velocity (ẋ₀);
Output: Controller parameters (Θ); initial pose (x₀); initial velocity
(ẋ₀); objective value (E)
1:      Project initial pose onto PCA space: s₀ = U⁻¹ (x₀ − b)
2:      if ẋ₀ = 0, Θ = 0 then
3:          Initialize initial velocity: ẋ₀ = 0
4:          Initialize controller parameters (Θ):
                s_i = s₀, α_i = 0.1, θ_i = [0, 0, 0], v_i = 0.25 ∀i ∈ [1, M]
5:      end if
6:      Initialize variance: Σ = Iσ
7:      Initialize mean: μ = [Θ, s₀, ẋ₀]^T
8:      for i = 1 → N_ITER do
9:          for J = 1 → N_POPULATION do
10:             Sample controller parameters and initial pose:
                    [Θ^(j), s₀^(j), ẋ₀^(j)] ∼ N (μ, Σ)
11:             Reconstruct initial pose:
                    x₀^(j) = Us₀^(j) + b
12:             for t = 1 → T + ΔT do
13:                 Control and simulation:
```

-continued

[Θ, x₀, ẋ₀, E] = BatchOp(S_M, x₀, Z, U, b, Θ, ẋ₀)

$$\begin{bmatrix} x_t^{(j)} \\ \dot{x}_t^{(j)} \end{bmatrix} = f\left(\begin{bmatrix} x_{t-1}^{(j)} \\ \dot{x}_{t-1}^{(j)} \end{bmatrix}, \pi\left(\begin{bmatrix} x_{t-1}^{(j)} \\ \dot{x}_{t-1}^{(j)} \end{bmatrix}, \Theta^{(j)}\right)\right)$$

14:　　　end for
15:　　　Compute objective:
　　　　　$E^{(j)} = \lambda_l E_{like} + \lambda_s E_{stab} + \lambda_p E_{prior} + \lambda_c E_{cont}$
16:　　end for
17:　　$|\mu, \Sigma| = \text{CMA\_update}(\mu, \Sigma, \{\Theta^{(j)}, s_0^{(j)}, \dot{x}_0^{(j)}, E^{(j)}\})$
18:　end for
19:　Let j* = argmin_j E^(j)
20:　return Θ^(j*), x₀^(j*), ẋ₀^(j*), E^(j*)

Batch optimization over an entire pre-processed video sequence can be a difficult problem. The number of possible controllers for controller structure $S_M$ is exponential in M, so simply enumerating a population of controller structures and estimating parameters for each of them in a batch may be inefficient. In addition, without good initialization, optimization of the high-dimensional parameter vector may get stuck in local optima. Experience has shown that an incremental optimization approach for estimating the controller structure may alleviate these problems.

As discussed, incremental optimization may include estimating controller structure locally and simultaneously with estimation of control parameters. In one embodiment, the controller structure and parameters are greedily selected as new observations are added. As a result, the high-dimensional batch-optimization problem is essentially broken down into a number of lower-dimensional optimization problems over an expanding motion window. Further, optimization results over a current window may provide good initialization for local optimization over an expanded window.

In the first stage of incremental optimization, the controller-estimation application may assume that the controller structure is a fixed initial structure having one state, $S_1 = \{\oplus \to \odot_1\}$, and the controller-estimation application may optimize the controller parameters using the first $T_s$ pre-processed video frames using the batch optimization from above. At each subsequent stage of incremental optimization, $T_s$ more frames from the pre-processed video sequence are added to the motion window, and the controller-estimation application re-optimizes the controller parameters to fit frames in the now longer window. This step is realized by performing a number of local optimizations, which may include proposing updates to the controller structure (e.g., addition of a state to the current chain of states). That is, at each stage, addition of a state to the current chain of states may be proposed and tested by re-optimizing the controller with and without the additional state. The controller-estimation application then selects a controller for use in the next stage of incremental optimization based on the best (e.g., lowest) objective value after re-optimization.

In one embodiment, incremental optimization may be implemented according to the following pseudo-code:

[S_M, Θ, x₀, ẋ₀, E] = IncremOp(x₀, Z, U, b)

Input: Initial pose (x₀); PCA prior (U, b); observations/image features
(Z = {z₀, z₁, ..., z_T})
Output: State-space controller structure (S_M); Controller parameters (Θ); initial pose (x₀); initial velocity (ẋ₀); objective value (E)
1:　Number of observations to add per stage:

$$T_s = \frac{T}{N_{STAGES}}$$

[S_M, Θ, x₀, ẋ₀, E] = IncremOp(x₀, Z, U, b)

2:　Initialize controller structure:
　　　M = 1　$S_1 = \{\oplus \to \odot_1\}$
3:　Optimize parameters:
　　　[Θ, x₀, ẋ₀, E] = BatchOp(S_M, x₀, z_{1:T_s}, U, b)
4:　for i = 2 → N_{STAGES} do
5:　　Re-optimize parameters:
　　　　[Θ, x₀, ẋ₀, E] = BatchOp(S_M, x₀, z_{1:T_s}, U, b, Θ, ẋ₀)
6:　　Try to add a state:
　　　　$S_M^+ = \{S_M \xrightarrow{\kappa_{M=0}} \odot_{M+1}\}$
　　　　[Θ⁺, x₀⁺, ẋ₀⁺, E⁺] = BatchOp(S_M^+, x₀, z_{1:T_s}, U, b, Θ, ẋ₀)
7:　　if E⁺ < E then
8:　　　$S_{M+1} = S_M^+$　M = M + 1
9:　　　[Θ, x₀, ẋ₀, E] = [Θ⁺, x₀⁺, ẋ₀⁺, E⁺]
10:　　end if
11:　end if In one embodiment, one or more of the last states of controllers may be optimized at any given stage, thereby ensuring a fixed compute time even as the number of states increases. In a further embodiment, multiple BatchOps may be executed at the same time. For example, the controller-estimation application may execute six BatchOps for every instance of BatchOp in the foregoing IncremOp pseudo-code to optimize the last one or two states of the controller, each with three different seeds.

Referring again to method 300, at step 340, the controller-estimation application re-optimizes all parameters of the controller structure taking into account all frames of the set of pre-processed video frames at once. As discussed, parameters for one or more last frames may be optimized during each incremental optimization stage. By contrast, re-optimization optimizes all parameters of each state of the controller structure using all pre-processed video frames. In one embodiment, re-optimization may be optional, as the compute time for optimizing all parameters based on all frames may be prohibitively large in some cases.

At step 350, the controller-estimation application refines the controller structure. In some embodiments, incremental optimization may be based on controller structures with transitions on timing, because such controllers are typically well-behaved and easier to optimize. However, controller structures with transitions on timing may not be optimal in terms of, e.g., stability or compactness. For example, a state transition based on time for landing after a jump may not work well if the environment is altered so that the time of landing changes. During controller structure refinement, the controller-estimation application alters the controller structure to make the controller more robust and re-estimates controller parameters after each alteration. For example, the state transition based on time for landing after a jump may be modified to a state transition based on contact, thereby permitting the controller to adapt to environmental changes even when they alter the time of landing. In one embodiment, refinement may be optional, as, similar to re-optimization, refinement may be computationally expensive.

In general, there may exist an equivalence class of controllers which can simulate the same motion. For example, a one-and-a-half cycle walking controller may be represented in at least three different ways:
(1) using a chain controller with transitions on timing:

$$S_6 = \{\oplus \to \odot_1 \xrightarrow{\kappa_1=0} \odot_2 \xrightarrow{\kappa_2=0} \odot_3 \xrightarrow{\kappa_3=0} \odot_4 \xrightarrow{\kappa_4=0} \odot_5 \xrightarrow{\kappa_5=0} \odot_6\};$$

(2) using a chain controller with some transitions on contact:

$$S'_6 = \left\{ \oplus \to \bigodot_1 \xrightarrow{\kappa_1=1} \bigodot_2 \xrightarrow{\kappa_2=0} \bigodot_3 \xrightarrow{\kappa_3=2} \bigodot_4 \xrightarrow{\kappa_4=0} \bigodot_5 \xrightarrow{\kappa_5=1} \bigodot_6 \right\};$$

or (3) using a cyclic controller:

$$S_4 = \left\{ \oplus \to \bigodot_1 \xrightarrow{\kappa_1=1} \bigodot_2 \xrightarrow{\kappa_2=0} \bigodot_3 \xrightarrow{\kappa_3=2} \bigodot_4 \xrightarrow{\kappa_4=0} \bigodot_1 \right\}.$$

Assuming transitions on time in $S_6$ are chosen coincident with contact events in $S'_6$ and $S_4$, the foregoing controllers will produce the same simulation results with the same atomic action controllers. Note, however, $S'_6$ and $S_4$ are more robust and $S_4$ is more compact in terms of representation. As a result, the controller-estimation application may choose $S_4$ over $S'_6$ and $S_6$ during structural refinement.

As discussed, a contact energy term $E_{cont}$ may help enforce the constraint that transitions on time coincide with contact events, if any. In such a case, experience has shown that transitions on time often coincide within a few frames with contact events. In one embodiment, the controller-estimation application may take advantage of such coincidence during structure refinement by performing a transformation $S'_M = \mathbb{T}_\perp(S_M)$ which transforms transitions on timing with appropriate transitions on contact in $S_M$ if the timing transition is within a given time (e.g., 0.2 seconds) of a contact and if only one contact change occurs within the time window (e.g., the 0.2 second window). Because the time event may not happen exactly on contact, in one embodiment the controller-estimation application may re-optimize controller parameters $\Theta$ using the parameters obtained from the incremental optimization as the initial guess. The controller-estimation application may further use a transformation $S'_M = \mathbb{T}_\infty(S_M)$ that greedily searches for cyclicity by comparing the type of transition, target pose, and control parameters to previous states. Again, controller parameters may be re-optimized, using the $\Theta$ obtained from the incremental optimization and re-optimization as the initial guess to account for minor miss-alignment. The controller-estimation application may choose a transformed controller over the simple chain controller if the resulting objective value is within acceptable tolerance $\delta$ (e.g., 15% of the objective value of the original controller).

In one embodiment, structural refinement may be implemented in addition to incremental optimization according to the following pseudo-code:

---

$[S_M, \Theta, x_0, \dot{x}_0, E] = \text{IncremPlusRefinement}(x_0, Z, U, b)$

Input: Initial pose $(x_0)$; PCA prior $(U, b)$; observations/image features $(Z = \{z_0, z_1, \ldots, z_T\})$
Output: State-space controller structure $S_M$; Controller parameters $(\Theta)$; initial pose $(x_0)$; initial velocity $(\dot{x}_0)$; objective value $(E)$
1: Incremental optimization:
    $[S_M, \Theta, x_0, \dot{x}_0, E] = \text{IncremOp}(x_0, Z, U, b)$
2: Structure transformation (for contact transitions):
    $S_{M'} = \mathbb{T}_\perp(S_M)$
    $[\Theta', x_0', \dot{x}_0', E'] = \text{BatchOp}(S_{M'}, x_0, Z, U, b, \Theta, \dot{x}_0)$
3: if $E' < E + \delta$ then
4:    $[S_M, \Theta, x_0, \dot{x}_0, E] = [S_{M'}, \Theta', x_0', \dot{x}_0', E']$
5: end if
6: Structure transformation (for cyclicity):
    $S_{M'} = \mathbb{T}_\infty(S_M)$
    $[\Theta', x_0', \dot{x}_0', E'] = \text{BatchOp}(S_{M'}, x_0, Z, U, b, \Theta, \dot{x}_0)$

---

$[S_M, \Theta, x_0, \dot{x}_0, E] = \text{IncremPlusRefinement}(x_0, Z, U, b)$

7: if $E' < E + \delta$ then
8:    $[S_M, \Theta, x_0, \dot{x}_0, E] = [S_{M'}, \Theta', x_0', \dot{x}_0', E']$
9: end if

---

Although discussed above with respect to transitions on contact and timing, alternative embodiments may include other transitions, including, but not limited to, transitions based on momentum or velocity changes, etc. In such cases, the controller-estimation application may alter the controller structure to, e.g., replace transitions based on timing with transitions based on changes of momentum or velocity, etc. In addition, the controller-estimation application may impose various constraints on the controller structure (e.g., state symmetry for symmetric motions) and parameters and enforce them during the structure refinement.

Although discussed above as separate steps, in one embodiment structural refinement and incremental optimization may be combined. That is, the controller-estimation application may attempt to, e.g., transform timing transitions to transitions on contact and to greedily search for cyclicity while also performing incremental optimization.

Figure 4:
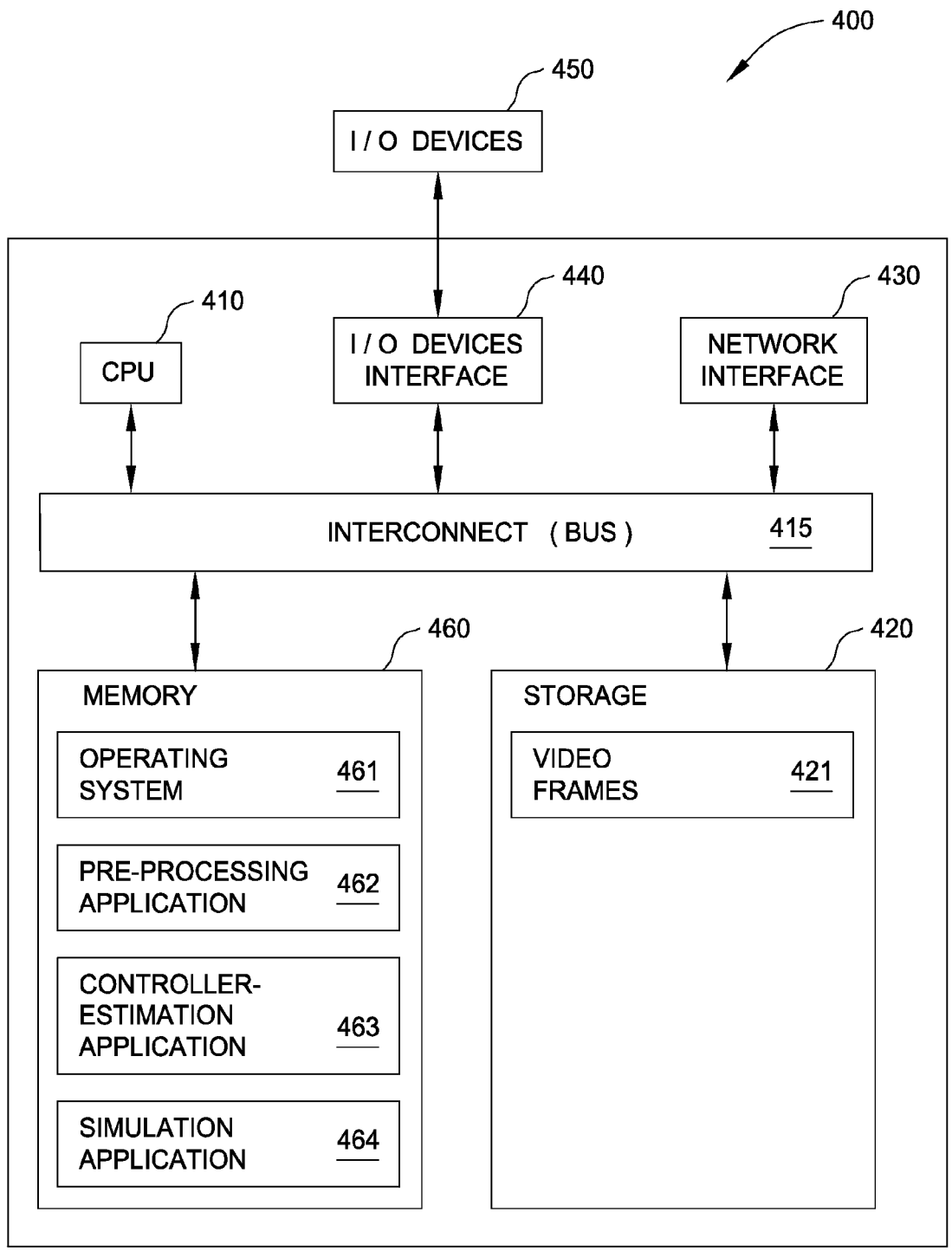
FIG. 4 depicts a block diagram of a system in which an embodiment may be implemented.

FIG. 4 illustrates a system 400 in which aspects of the invention may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and removable storage devices, such as tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skills in the art will recognize that the components of the system 400 shown in FIG. 6 may be distributed across multiple computing systems connected by a data communications network.

As shown, the memory 460 includes an operating system 461 and applications 462-464. Illustratively, the operating system may include Microsoft's Windows®. The applications 462-464 include a preprocessing application 462 which extracts features from video frames 421 stored in storage 420. In one embodiment, pre-processing may include extracting foreground silhouettes, as discussed above with respect to FIGS. 1 and 3. The applications 462-464 further include a controller-estimation application 463 which determines based on the extracted features controller structure and parameters to simulate the motion depicted in the video frames 421. In one embodiment, the controller-estimation application 463 may perform incremental optimization, re-optimization, and controller structure refinement, as discussed above with respect to FIGS. 1-3.

The applications 462-464 further include a simulation application 464, which in one embodiment may be configured to simulate a dynamic and responsive character using the controller estimated by the controller-estimation application 463. As discussed, such a simulation may be performed in an environment which is different from that depicted in the video frames 421. In an alternative embodiment, the simulation application 464 may send signals to a physical robot indicating joint movements to be made in performing the motion according to the estimated controller. That is, the simulation application 464 may determine based on the estimated controller provided by the controller-estimation application 463 instructions that are sent to the robot and cause the robot to move according to those instructions.

Although discussed above primarily with respect to single-view video, alternative embodiments may make use of other input, such as multiple views or depth maps generated from depth sensor data, which may produce improved results. Although discussed above with respect to a fully-automated technique, alternative embodiments may also account for user input. For example, a user may click on joint locations in the video frames, and such joint locations may be treated as video frame features, similar to the silhouettes discussed above. Further, although discussed above with respect to video frames having human motions performed on planar surfaces, alternative embodiments may estimate controllers for simulating motions of other entities (e.g., animals) performed in non-planar environments in the video frames. In such a case, a skeletal model of the entity (e.g., the animal) with limbs and mass properties may be used in lieu of the human skeletal model discussed above, and a model of the non-planar environment of the video frames may be used in lieu of a planar model.

Advantageously, techniques disclosed herein simultaneously solve the problems of marker-less motion capture and bipedal control from noisy data, better leveraging information present in video of human motion and simplifying the marker-less tracking problem. Techniques disclosed herein are able to estimate controllers for a variety of complex and dynamic motions, and the controllers can be used to simulate the motion in 3D with a virtual character or a physical robot. Further, the recovered controllers also include feedback balancing mechanisms which allow captured motions to be realistically adapted to different environments with novel terrain, dynamic objects, and the like.

While the foregoing is directed to aspects of the present invention, other and further aspects of the invention may be devised without departing from the basic scope thereof, and the scope thereof is determined by the claims that follow.

What is claimed is:

1. A computer-implemented method for estimating a state-space controller from a set of video frames, comprising:
    receiving the set of video frames, wherein the video frames include two-dimensional (2D) images which depict a motion of an entity;
    initializing, via one or more processors, the state-space controller, wherein the state-space controller includes states each corresponding to an atomic controller and transitions between the states; and
    incrementally optimizing parameters of the state-space controller and changing a structure of the state-space controller to approximate through simulation the motion as depicted in an initial subset of the video frames and in expanded subsets of the video frames,
        wherein the parameters include at least one of representations of target poses for angular configurations of a body and control and balance parameters,
        wherein parameters of a last one or more states of the state-space controller are optimized at each stage of the incremental optimization, and
        wherein changing the structure of the state-space controller includes adding one or more additional states and transitions between states to the state space controller.

2. The method of claim 1, further comprising, pre-processing the video frames to extract one or more image features from each video frame.

3. The method of claim 2, wherein the image features include at least one of foreground silhouettes, edges, color, texture, and motion capture marker locations.

4. The method of claim 1, further comprising re-optimizing the parameters of the state-space controller based on all of the video frames.

5. The method of claim 1, further comprising altering the structure of the state-space controller for robustness and compactness by at least one of adding cycles in the structure, enforcing constraints on the structure of the state-space controller, adding a state transition type, and modifying a state transition type.

6. The method of claim 5, wherein the incremental optimization minimizes an objective function with respect to state-space controller structure and parameters, initial pose, and initial velocity.

7. The method of claim 1, wherein the incremental optimization is greedy.

8. The method of claim 1, wherein the video frames include one or more depth maps.

9. The method of claim 1, where the incremental optimization is implemented using a genetic search algorithm.

10. The method of claim 1, where the incremental optimization is implemented using a sampling-based optimization.

11. A non-transitory computer-readable storage media storing instructions, which when executed by a computer system, perform operations for estimating a state-space controller from a set of video frames, the operations comprising:
    receiving the set of video frames, wherein the video frames include two-dimensional (2D) images which depict a motion of an entity;
    initializing the state-space controller, wherein the state-space controller includes states each corresponding to an atomic controller and transitions between the states; and
    incrementally optimizing parameters of the state-space controller and changing a structure of the state-space controller to approximate through simulation the motion as depicted in an initial subset of the video frames and in expanded subsets of the video frames,
        wherein the parameters include at least one of representations of target poses for angular configurations of a body and control and balance parameters,
        wherein parameters of a last one or more states of the state-space controller are optimized at each stage of the incremental optimization, and
        wherein changing the structure of the state-space controller includes adding one or more additional states and transitions between states to the state space controller.

12. The computer-readable storage media of claim 11, the operations further comprising, pre-processing the video frames to extract one or more image features from each video frame.

13. The computer-readable storage media of claim 12, wherein the image features include at least one of foreground silhouettes, edges, color, texture, and motion capture marker locations.

14. The computer-readable storage media of claim 11, the operations further comprising, re-optimizing the parameters of the state-space controller based on all of the video frames.

15. The computer-readable storage media of claim 11, the operations further comprising altering the structure of the state-space controller for robustness and compactness by at least one of adding cycles in the state-space controller, enforcing constraints on the structure of the state-space controller, adding a state transition type, and modifying a state transition type.

16. The computer-readable storage media of claim 15, wherein the incremental optimization minimizes an objective function with respect to state-space controller structure and parameters, initial pose, and initial velocity.

17. The computer-readable storage media of claim 11, wherein the video frames include one or more depth maps.

18. The computer-readable storage media of claim 11, where the incremental optimization is implemented using a genetic search algorithm.

19. The computer-readable storage media of claim 11, where the incremental optimization is implemented using a sampling-based optimization.

20. A system, comprising:
a processor; and
a memory, wherein the memory includes an application program configured to perform operations for estimating a state-space controller from a set of video frames, the operations comprising:
receiving the set of video frames, wherein the video frames include two-dimensional (2D) images which depict a motion of an entity,
initializing the state-space controller, wherein the state-space controller includes states each corresponding to an atomic controller and transitions between the states, and
incrementally optimizing parameters of the state-space controller and changing a structure of the state-space controller to approximate through simulation the motion as depicted in an initial subset of the video frames and in expanded subsets of the video frames;
wherein the parameters include at least one of representations of target poses for angular configurations of a body and control and balance parameters;
wherein parameters of a last one or more states of the state-space controller are optimized at each stage of the incremental optimization; and
wherein changing the structure of the state-space controller includes adding one or more additional states and transitions between states to the state space controller.

* * * * *